(12) United States Patent
Kolb et al.

(10) Patent No.: US 8,362,911 B2
(45) Date of Patent: Jan. 29, 2013

(54) DEVICE FOR VEHICLE SEAT OCCUPANCY DETECTION

(75) Inventors: Jens Kolb, Koenigstein (DE); Frank Himmelhuber, Kuemmersbruck (DE)

(73) Assignee: Grammer AG, Amberg (DE)

(*) Notice: Subject to any disclaimer, the term of this patent is extended or adjusted under 35 U.S.C. 154(b) by 897 days.

(21) Appl. No.: 12/433,383

(22) Filed: Apr. 30, 2009

(65) Prior Publication Data

US 2009/0273484 A1 Nov. 5, 2009

(30) Foreign Application Priority Data

May 3, 2008 (DE) .......................... 10 2008 022 046

(51) Int. Cl.
*G08B 21/00* (2006.01)
(52) U.S. Cl. .................... 340/667; 340/426.24; 340/457; 340/665; 340/666; 297/217.3; 297/344.12; 297/344.15; 297/344.16
(58) Field of Classification Search .................. 340/667, 340/428, 426.24, 457, 457.1, 573.1, 665, 340/666, 668; 297/217.3, 344.12, 344.15, 297/344.16; 248/550
See application file for complete search history.

(56) References Cited

U.S. PATENT DOCUMENTS

| | | | | |
|---|---|---|---|---|
| 5,058,852 A * | 10/1991 | Meier et al. | | 248/588 |
| 5,169,112 A * | 12/1992 | Boyles et al. | | 248/550 |
| 6,055,473 A * | 4/2000 | Zwolinski et al. | | 701/49 |
| 2003/0038221 A1* | 2/2003 | Fu et al. | | 248/421 |
| 2003/0201660 A1* | 10/2003 | Janscha et al. | | 297/216.17 |
| 2005/0110243 A1* | 5/2005 | Meier et al. | | 280/727 |
| 2009/0267392 A1 | 10/2009 | Himmelhuber et al. | | |

FOREIGN PATENT DOCUMENTS

| | | |
|---|---|---|
| DE | 19751677 | 5/1999 |
| DE | 19826287 | 12/1999 |
| DE | 10007014 | 10/2001 |
| DE | 10239761 | 3/2004 |
| DE | 10320287 | 12/2004 |
| DE | 102004024691 | 2/2006 |
| DE | 102006017774 | 10/2007 |
| DE | 102006042673 | 3/2008 |
| EP | 1498703 | 1/2005 |

\* cited by examiner

*Primary Examiner* — Daryl Pope
(74) *Attorney, Agent, or Firm* — Lowe Graham Jones PLLC

(57) ABSTRACT

Device for vehicle seat occupancy detection, wherein a base frame which can be adjusted in the height direction of a vehicle seat and which is composed of at least two scissors arms which are connected to one another is arranged between a seat part of the vehicle seat and a vehicle body part, the device comprising a first detector which is attached to at least one of the scissors arms and which, when the vehicle seat is occupied by a minimum weight, detects a predefinable height setting of the scissors arm which is lower than a maximum possible height setting, and at least one spring which is fixed to at least one of the scissors arms and the predefinable pretensioned spring force of which corresponds at most to the downward-acting weight force due to the minimum weight and counteracts the latter.

15 Claims, 2 Drawing Sheets

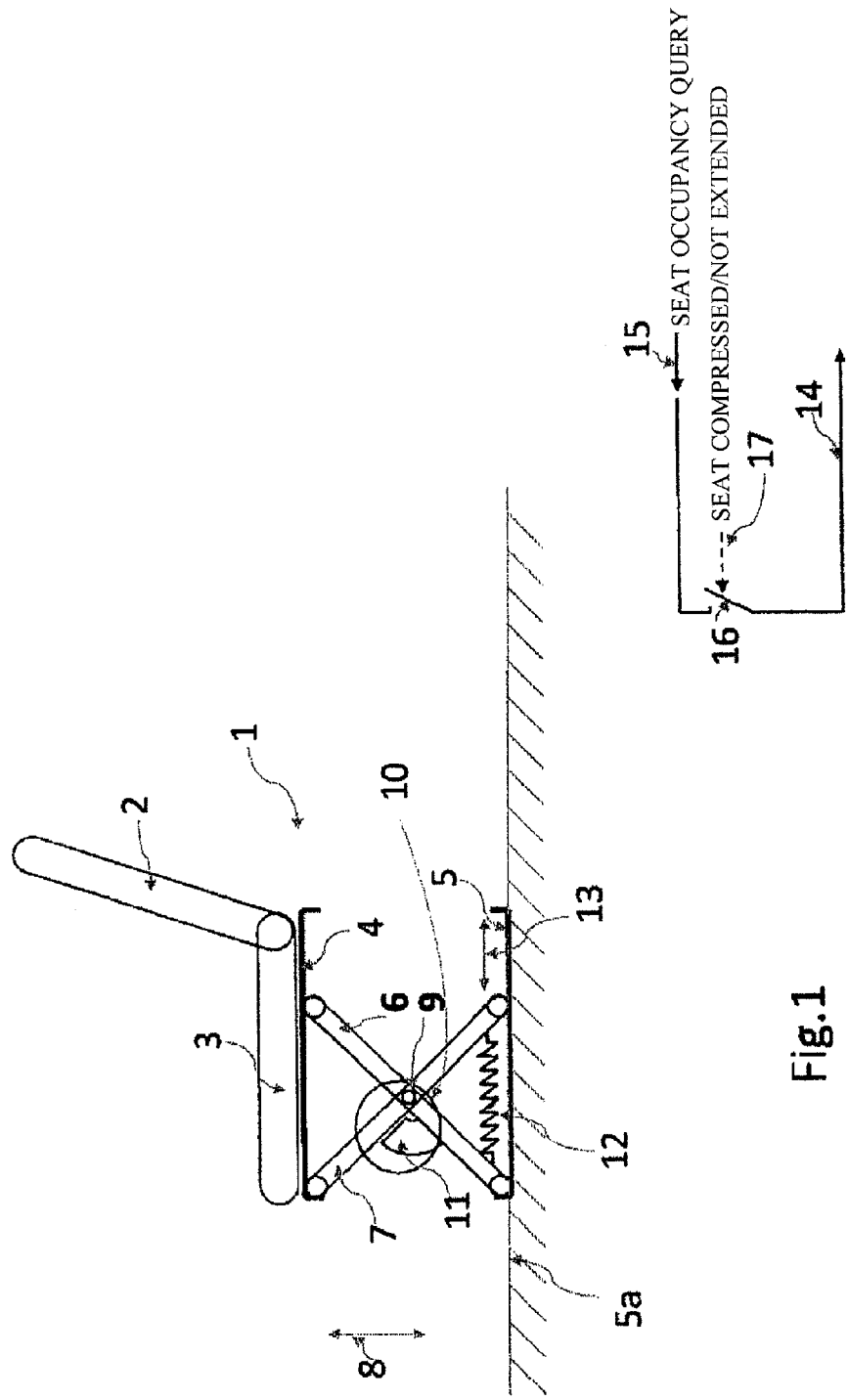

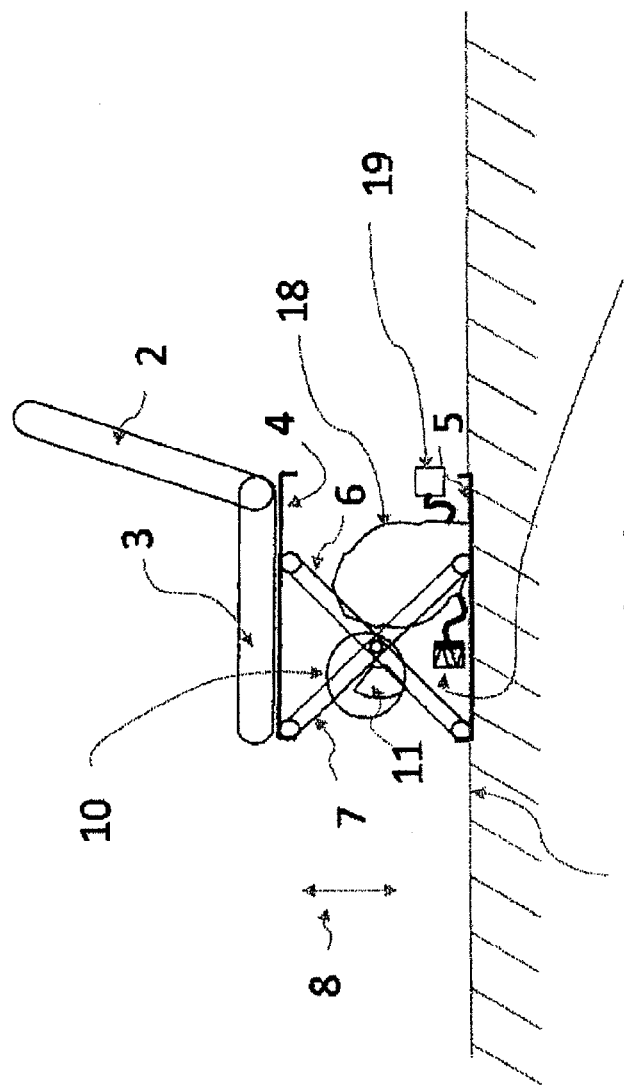
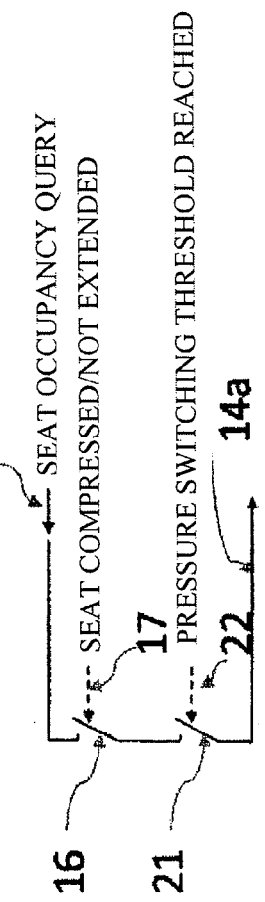

DEVICE FOR VEHICLE SEAT OCCUPANCY DETECTION

PRIORITY CLAIM

This application claims the benefit of German Application Serial No. 10 2008 022 046.9 filed May 3, 2008, contents of which are incorporated herein.

FIELD OF THE INVENTION

The invention relates to a device for vehicle seat occupancy detection and, more specifically, to a vehicle seat occupancy detection device having a base frame which is arranged between a seat part of a vehicle seat and a vehicle body part and which is composed of at least two scissors arms which are connected to one another.

BACKGROUND OF THE INVENTION

Until now, seat occupancy detection methods and devices for on vehicle seats have primarily consisted of a rocker arranged below a cushion of a seat part of the vehicle seat, with a pressure sensor arranged below said rocker. See, e.g., DE 103 20 287 A1. As soon as the rocker, which due to necessarily being integrated in the seat part has a complicated structure with regard to its shape, is pushed downwards by a movement of the cushion part or of the seat part, the pressure sensor is activated and a seat movement is detected.

However, such a device for seat occupancy detection does not make it possible, or makes it possible only to a limited extent, to distinguish between a weight acting on the seat part due to a person sitting on the seat and a weight acting on the seat part due only to an object being placed on the seat part.

Although safety-related features of the vehicle, such as for example an immobilizer or the electronic activation of an ignition system of a vehicle for starting purposes, are dependent on the detection of such a seat occupancy, in the previous devices for seat occupancy detection an occupancy need not necessarily take place by a person in order to activate these safety-related features, i.e. for example to disengage an immobilizer or to electronically activate the ignition system for a starting process.

Accordingly, there is a need for a device for vehicle seat occupancy detection which makes it possible in a simple and reliable manner to distinguish between the weight of persons sitting on the seat and objects placed on the seat.

SUMMARY OF THE INVENTION

The present invention is directed to a device for vehicle seat occupancy detection that makes it possible in a simple and reliable manner to distinguish between the weight of persons sitting on the seat and objects placed on the seat.

A vehicle seat occupancy detection device having a base frame which can be adjusted in the height direction of a vehicle seat and which is composed of at least two scissors arms which are connected to one another and are arranged between a seat part of the vehicle seat and a vehicle body part. A first detector is attached to at least one of the scissors arms and configured such that when the vehicle seat is occupied by a minimum weight, the first detector detects a predefinable height position of the scissors arm which is lower than a maximum possible height position. Also provided is at least one spring which is fixed to at least one of the scissors arms and the predefinable pretensioned spring force of which corresponds at most to the downward-acting weight force due to the minimum weight and counteracts the latter. By providing such a spring having a pretensioned spring force which acts even when the vehicle seat is not occupied, in combination with the first detector which detects the lower height position, advantageously the spring having the pretensioned spring force and thus the scissors arms are moved downwards from above only when a certain minimum weight acts in the downward direction on the scissors arms from above due to the vehicle seat being occupied by a person having a minimum weight. Only once this pretensioned spring force has been overcome is a lower height position detected by the first detector, which at the same time may be a mechanically and/or electrically operated first switch.

Since the detection of the lower height position by the first detector generates or outputs a signal for the existence of a desired seat occupancy and similarly the spring generates or outputs a further signal to indicate that the seat is occupied by a minimum weight acting on the seat part from above, when these two signals are present it is indicated to a control device that the seat is being occupied by the desired minimum weight. The control device can then generate and output, based on the existence of such a desired seat occupancy by the desired minimum weight, signals to enable safety-related features, such as for example the activation of an ignition system for ignition purposes or the disengagement of a previously locked immobilizer. In an alternative embodiment, the invention further includes a display device, for example a screen or as an LED, which displays a recognized seat occupancy detection result.

In one embodiment utilizing a mechanical spring as the spring, the pretensioned spring force is set using a turn spacing switch of a spiral spring, which measures the spacing of the individual spiral spring turns in order to indicate, when a predefinable spacing is reached, the existence of the desired pretensioned spring force of the spring.

Alternatively, if the spring is designed as a gas spring, in particular as an air spring, a pressure switch can be used which measures the pressure within the gas spring and thus indicates a minimum pressure to form a pretensioned spring force within the gas spring.

According to one preferred embodiment, a second detector is provided which, when the vehicle seat is occupied by a weight greater than the minimum weight, detects an exceeding of the pretensioned spring force on the spring. This second detector indicates for example, if the spring is designed as a gas spring, when the desired minimum pressure set as the pretensioned spring force is exceeded, in order thus to transmit a signal which indicates that a seat occupancy by the desired minimum weight has been detected.

Upon detection of the predefinable lower height position of the scissors arm, the first detector transmits a first signal to a first switch in a control current circuit for controlling a seat occupancy detection signal, in order thus to close the first switch. Likewise, upon detection of the exceeding of the pretensioned spring force of the spring, the second detector transmits a second signal to a second switch in the control current circuit, in order thus to close the second switch.

Advantageously, the first and the second switches are connected in series in the control current circuit so that, when both the switches are in a closed state, a closed control current circuit exists which generates a control signal which indicates that the seat is being occupied by the minimum weight.

Advantageously, a time-based switch is provided which carries out the activation of the device for seat occupancy detection according to the invention after a predefinable time period once the seat has been left by the person previously occupying the seat. As a result, if the seat is briefly left and then occupied again, no renewed seat occupancy detection is carried out. Such a minimum time period for interrupting a seat occupancy detection can moreover advantageously be used to ensure that peaks in the movement of the suspension process, which in the case of upward and downward vibration of the seat part relative to the vehicle body part by means of the scissors arms can lead to a brief drop below the pretensioned spring force, are not interpreted by the device according to the invention as a renewed seat occupancy detection process.

According to one preferred embodiment, if a gas spring is used as the spring, this is acted upon by a predefinable pretensioned pressure value or pressure threshold value in order to set the pretensioned spring force. This can be carried out by means of an air supply and discharge control wherein, in the event of increased pressure within the gas spring in a state of non-occupancy of the vehicle seat, air is discharged until the pressure threshold value for the desired pretensioned spring force is set. Similarly, gas pressure can be built up within the gas spring by means of the air supply and discharge control in order to build up the desired pressure threshold value in the event of a gas pressure in a state of non-occupancy of the seat which is below the desired pressure threshold value for setting the pretensioned spring force.

The second detector may advantageously be designed as a pressure sensor and/or a pressure switch in order to measure the pressure threshold value to be measured therein and the subsequent pressure being built up as a result of the seat being occupied.

According to one preferred embodiment, both the first and the second detectors are respectively designed as a switch. By way of example, the first detector may be attached as a switch to one of the scissors arms in such a way that said switch is mechanically actuated by a section of the first scissors arm pressing against the switch in order to actuate the latter, wherein the switch per se is arranged on the second scissors arm.

BRIEF DESCRIPTION OF THE DRAWINGS

Advantages and expedient features can be found in the following description in conjunction with the drawing, in which:

FIG. 1 shows, in a schematic side view, a vehicle seat having a device according to the invention for vehicle seat occupancy detection according to a first embodiment of the invention;

FIG. 2 shows, in a schematic detail view, a control current circuit for detecting a seat occupancy in connection with the device for vehicle seat occupancy detection according to the first embodiment;

FIG. 3 shows, in a schematic side view, a vehicle seat having a device according to the invention for vehicle seat occupancy detection according to a second embodiment of the invention; and FIG. 4 shows, in a schematic detail view, a control current circuit for detecting seat occupancy for the device according to the invention for vehicle seat occupancy detection according to the second embodiment of the invention.

DETAILED DESCRIPTION OF THE PREFERRED EMBODIMENT

FIG. 1 shows, in a schematic view, a vehicle seat having a device for vehicle seat occupancy detection according to a first embodiment of the invention. The vehicle seat 1 consists of a backrest 2 and a seat part 3, wherein a base frame 25 comprising two scissors arms 6, 7 is arranged between the seat part 3 and a vehicle body part 5a, such as for example the floor panel of a utility vehicle cab.

The two scissors arms 6, 7 are displaceably arranged between an upper part 4 and a lower part 5 of the base frame.

When the seat part 3 is acted upon as a result of the seat being occupied, a downward movement of the vehicle seat takes place, as indicated by the double arrow 8, and at the same time the two scissors arms 6, 7 move apart from one another, as shown by the double arrow 13. Such a pivoting movement of the two scissors arms 6, 7 relative to one another about a common axis of rotation 9 means that the vehicle seat undergoes an upward and downward movement as indicated by the double arrow 8 both when the seat is first occupied and also during the suspension process which acts on the vehicle seat while the vehicle is travelling.

Preferably arranged on the scissors arm 6 is a first detector 10 which is connected to a switch 11. When the scissors arm 7 is pivoted relative to the scissors arm 6, this switch 11 can be actuated by a downward movement of the scissors arm 7 in its left-hand top region, and as a result a detection signal which is intended to indicate that the vehicle seat has a lower height position than its maximum possible height position can be transmitted to a control current circuit (not shown).

Advantageously, the first switch 11 within the first detector 10 is not moved until a pretensioned spring force of a spring 12, which is fixed between the two scissors arms 6, 7, is overcome. Such an overcoming of the pretensioned spring force takes place as a result of the fact that the scissors arms 6, 7 are moved counter to the spring force of the spring 12 once a minimum weight or a person having a minimum weight takes up position on the seat part 3. In this way, it is possible to detect whether the seat part is being occupied by a lightweight object or by a person having a minimum weight.

FIG. 2 shows, in a schematic diagram, part of a control current circuit as may be used in a device for seat occupancy detection according to a first embodiment. The control current circuit 14 is closed by means of a first circuit switch 16 once the vehicle seat is in a compressed state, i.e. has a lower height position. This does not occur until the pretensioned spring force of the spring 12 is overcome due to the seat part 3 being occupied by a minimum weight and until the two scissors arms have been moved apart from one another in order thus to move the upper part 4 downwards. The signal 17 thereby generated at the first detector 10 is transmitted to the first circuit switch 16 and causes the first circuit switch 16 to close only once this lower height position exists. As a result, the control current circuit 14 is closed and a query signal 15 can thus be transmitted to a control device (not shown) for further use of the detected seat occupancy state.

FIG. 3 shows, in a schematic side view, a vehicle seat having a device for seat occupancy detection according to a second embodiment of the invention. Components which are identical and which have the same function are provided with the same references.

In this device for seat occupancy detection according to the second embodiment, once again the first detector 10 is provided with the first switch 11, wherein a gas spring, in particular an air spring 18, is now provided instead of the mechanical spring 12 for height adjustment of the scissors arms 6, 7 and thus of the vehicle seat as a whole.

The air spring 18 is connected to an air supply and discharge control 20 which makes it possible to set a minimum pressure or a pressure up to a pressure threshold value as the pretensioned spring force to be applied.

A second detector 19, which acts as a mechanical or contactless, in particular induction-based detector and at the same time as a second switch, serves to transmit a signal to a second circuit switch 21, as shown in FIG. 4, which shows part of an alternative control current circuit for the device according to the second embodiment, and to close said switch. This is represented by reference 22.

A closing of the second circuit switch 21 takes place when the predefinable pressure threshold value, i.e. a minimum pressure within the air spring 18, is exceeded. Such an exceeding is achieved by the seat part 3 being occupied by a person having a minimum weight. Once this minimum weight is present, the air spring, which has the pretensioned spring force in the form of a minimum pressure application, moves and brings about an actuation of the second switch by means of the second detector as a result of the pressure threshold value being exceeded. By means of signaling, the second switch then causes the second circuit switch 21 to close.

Of course, both the first switch 11 and the second switch, which is arranged within the second detector 19, can at the same time be the two switches 16, 21, so that the control current circuit 14*a* is closed directly by the first and second switches. This means that no additional signaling to further first and second circuit switches 16, 21 by the first two switches is required.

In turn, as a result of the closing of the control current circuit 14*a*, a signal relating to a query 15 is transmitted to a control device (not shown) which processes this signal in relation to seat occupancy detection for further use.

The first and second circuit switches 16, 21 are preferably connected in series so that a signal concerning the fact that the seat is being occupied by a minimum weight is forwarded in the control current circuit 14*a* only once both first and second circuit switches 16, 21 are closed.

Such a vehicle seat having the device according to the invention for seat occupancy detection can be combined with a device for a travelling height stop. In this case, the maximum possible height position of the scissors arms would preferably be defined as that height position which is defined by a height limitation due to the travelling height stop. This could advantageously take place for example in that a first cam or equivalent structure is provided which is able to actuate the switch only in that height position which is not height-limited.

In an alternative embodiment, a second cam may be used to serve as a switching path in order to bring about, by means of the first cam, a release of the first and second switches in a compressed height position of the seat. This has the advantage that a spring breakage, which might undesirably exist, for example, on the spring 12, can be distinguished from a seat occupancy. This can also be achieved if the first cam is designed in such a way that it acts for the extended state, i.e. the highest possible height position of the vehicle seat.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle seat occupancy detection device for use with a vehicle seat, comprising:
   a base frame which can be adjusted in the height direction of the vehicle seat, the base frame arranged between a seat part of the vehicle seat and a vehicle body part and having at least two scissors arms connected to one another;
   a first detector directly connected to at least one of the scissors arms, the first detector configured to detect a predefinable height position of the at least one scissors arm that is lower than a maximum possible height position when the vehicle seat is occupied by a minimum weight; and
   at least one spring connected to at least one of the scissors arms, the spring having a predefinable pretensioned spring force that corresponds at most to the downward-acting weight force due to the minimum weight and counteracts the latter, wherein the predefinable height position is only detected by said first detector once said predefinable pretensioned spring force has been overcome.

2. The vehicle seat occupancy detection device according to claim 1, wherein the first detector is configured to transmit a first signal to a first switch in a control current circuit for controlling a seat occupancy detection signal in order to close the first switch upon detection of the predefinable lower height position of the scissors arm.

3. The vehicle seat occupancy detection device according to claim 2, further comprising a second detector configured to detect an exceeding of the pretensioned spring force on the spring when the vehicle seat is occupied by a weight greater than the minimum weight.

4. The vehicle seat occupancy detection device according to claim 3, wherein the second detector is configured to transmit a second signal to a second switch in a control current circuit in order to close the second switch upon detection of the exceeding of the pretensioned spring force of the spring.

5. The vehicle seat occupancy detection device according to claim 4, wherein the first and second switches are connected in series in the control current circuit.

6. The vehicle seat occupancy detection device according to claim 3, wherein the second detector is a pressure sensor.

7. The vehicle seat occupancy detection device according to claim 3, wherein the second detector is a pressure switch.

8. The vehicle seat occupancy detection device according to claim 4, wherein at least one of the first or second switches is integrated in at least one of the first or second detectors.

9. The vehicle seat occupancy detection device according to claim 1, further comprising a second detector configured to detect an exceeding of the pretensioned spring force on the spring when the vehicle seat is occupied by a weight greater than the minimum weight.

10. The vehicle seat occupancy detection device according to claim 9, wherein the second detector is configured to transmit a second signal to a second switch in a control current circuit in order to close the second switch upon detection of the exceeding of the pretensioned spring force of the spring.

11. The vehicle seat occupancy detection device according to claim 9, wherein the second detector is a pressure sensor.

12. The vehicle seat occupancy detection device according to claim 9, wherein the second detector is a pressure switch.

13. The vehicle seat occupancy detection device according to claim 1, wherein the spring is a gas spring.

14. The vehicle seat occupancy detection device according to claim 13, wherein the gas spring is an air spring.

15. The vehicle seat occupancy detection device according to claim 13, wherein the gas spring is acted upon by a predefinable pretensioned pressure value in order to set the pretensioned spring force.

* * * * *